US005496962A

United States Patent [19]

Meier et al.

[11] Patent Number: 5,496,962

[45] Date of Patent: Mar. 5, 1996

[54] SYSTEM FOR REAL-TIME MUSIC COMPOSITION AND SYNTHESIS

[76] Inventors: Sidney K. Meier, 2 Sheepfold La., Hunt Valley, Md. 21030; Jeffrey L. Briggs, 20525 Keeney Mill Rd., Freeland, Md. 21053

[21] Appl. No.: 252,110

[22] Filed: May 31, 1994

[51] Int. Cl.$^{6}$ .......................... G01H 7/00

[52] U.S. Cl. .......................... 84/601; 84/609; 84/610; 84/634

[58] Field of Search .......................... 84/601, 609–611, 84/634, 635, 649–651, 666, 667

[56] References Cited

U.S. PATENT DOCUMENTS 4,399,731 8/1983 Aoki .
4,406,203 9/1983 Okamoto et al. .
4,602,546 7/1986 Shinohara .
4,920,851 5/1990 Abe .
4,939,974 7/1990 Ishida et al. .
5,003,860 4/1991 Minamitaka .......................... 84/609
5,129,302 7/1992 Nishikawa et al. .
5,175,696 12/1992 Hooper et al. .
5,199,710 6/1992 Tsurumi et al. .
5,208,416 5/1993 Hayakawa et al. .
5,249,262 9/1993 Baule .
5,259,066 11/1993 Schmidt .
5,259,067 11/1993 Kautz et al. .
5,281,754 1/1994 Farrett et al. .
5,418,323 5/1995 Kohonen .......................... 84/609

*Primary Examiner*—William M. Shoop, Jr.
*Assistant Examiner*—Jeffrey W. Donels
*Attorney, Agent, or Firm*—Popham, Haik, Schnobrich & Kaufman, Ltd.

[57] ABSTRACT

A system for automatically generating musical compositions on demand one after another without duplication. The system can produce such compositions upon demand in a variety of genres and forms so that concerts based on generated compositions will have a varied mix of pieces incorporated therein. The system incorporates a "weighted exhaustive search" process that is used to analyze the various aspects in developing the composition, from small-scale, note-to-note melodic construction to large-scale harmonic motions. The process maintains a balance between melodic, harmonic and contrapuntal elements in developing the composition. In general, the "weighted exhaustive search" process involves generating a plurality of solutions for producing each element of the composition. Each one of the plurality of solutions is analyzed with a series of "questions". Each solution is then scored based upon how each question is "answered" or how much that particular solution fits the parameters of the question.

16 Claims, 7 Drawing Sheets

SYSTEM FOR REAL-TIME MUSIC COMPOSITION AND SYNTHESIS

BACKGROUND OF THE INVENTION

1. Field of the Invention

The present invention is directed to the implementation of a system for creating original musical compositions by and in a computer-based device.

2. Related Art

In the prior art, the concept and development of automated music composition has existed since 1956. The work in automated music composition has generally been divided into two broad categories: the creation of music in a "new style" and the creation of music based upon an "existing style". Developments in the latter began in the middle 1960's. This early work was concerned primarily with using analyses of statistical distributions of musical parameters to discover underlying principles of musical organization. Other attempts have tried to show relationships between language and style in order to define elements of style. Still other developments have used existing music as source material with algorithms to "patch" music together, with the existing music already in the desired style such that patchworking techniques simply rearrange elements of the existing music.

In one such example, melodic materials from one piece, harmonic materials from another and written materials from yet another are taken and combined in order to create new pieces. Another example involves rule-based systems like David Cope's "Experiments in Musical Intelligence" (EMI) as discussed in his book *Computers and Musical Style,* A-R Editions, Incorporated, Madison, Wis. (1991). This rule-based EMI system uses a database of existing music and a pattern matching system to create its music.

In particular, the EMI system generates musical compositions based on patterns intended to be representative of various well known composers or different types of music. However, the implementation of the EMI system can and has generated compositions that are inconsistent with the style or styles of those the system is intended to imitate or that are nonsensical as a whole. Other systems of automated music composition are just as limited, if not more so, in their capabilities for producing musical compositions. Such other systems have relied primarily on databases of or algorithms supposedly based on the styles of known composers. These systems at best merely recombine the prior works or styles of known composers in order to produce "original" compositions.

For example, U.S. Pat. No. 5,281,754 to Farrett et al. discloses a method and system for automatically generating an entire musical arrangement including melody and accompaniment on a computer. However, Farrett et al. merely combines predetermined, short musical phrases modified by selection of random parameters to produce data streams used to drive a MIDI synthesizer and thereby generate "music".

U.S. Pat. No. 4,399,731 to Aoki discloses an apparatus for automatically composing a music piece that comprises a memory that stores a plurality of pitch data. Random extractions of the memory are made based on predetermined music conditions to form compositions of pitch data and duration data specifically for sound-dictation training or performance exercises. This device merely creates random combinations of sound data for the purpose of music training without any capability of generating any coherent compositions that could be considered "music".

Like the prior art as a whole, these two references fall far short of embodying any structure or method even remotely approaching any of the features and advantages of the present invention.

SUMMARY OF THE INVENTION

One of the primary objects of the present invention is to provide a system that automatically generates original musical compositions on demand one after another without duplication.

Another object of the present invention is to provide a system for producing musical compositions upon demand in a variety of genres and forms so that concerts based on generated compositions will have a varied mix of pieces incorporated therein.

Among the main features of the present invention, the system incorporates a "weighted exhaustive search" process that is used to analyze the various aspects in developing the composition, from small-scale, note-to-note melodic construction to large-scale harmonic motions. In essence, the process maintains a balance between melodic, harmonic and contrapuntal elements in developing the composition.

In general, the "weighted exhaustive search" process involves generating a plurality of solutions for producing each element of the composition. Each one of the plurality of solutions is analyzed with a series of "questions". Each solution is then scored based upon how each question is "answered" or how much that particular solution fits the parameters of the question. The process of scoring each solution based on questioning is used on the microlevel "note-to-note" as well as the macro level "phrase-to-phrase" with a different set of questions or parameters being used for each level.

Each of the different components or sections of the composition are generated using the "weighted exhaustive search" until the entire composition is produced. Another feature of the present invention is that solutions generated by the system with apparently negative qualities may be used if there are enough important positive qualities. The present invention is thus allowed a considerable level of flexibility whereby the invention is able to utilize the fundamentals of music theory, while not being limited to merely repeating or reusing established methods of musical composition.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENT

The musical terms used herein are in accordance with their definitions as set forth in *The Harvard Brief Dictionary of Music,* New York, N.Y. 1971 which is hereby incorporated by reference.

In a preferred embodiment, the present invention operates in the environment of the Panasonic 3DO Interactive Multiplayer system which incorporates a central processing computer, a large capacity of random access memory (i.e., 3 Mbytes), a CD-ROM disk drive, a special purpose music generation chip, and a hand-held controller, to control direct video and audio output to a television, stereo system or other standard output device. Details on the Panasonic 3DO system itself are described in the *3DO Portfolio and 3DO Toolkit: 3Do Developer's Documentation Set,* Volume 4 The 3DO Company (1993–94) which is hereby incorporated by reference.

Figure 1:
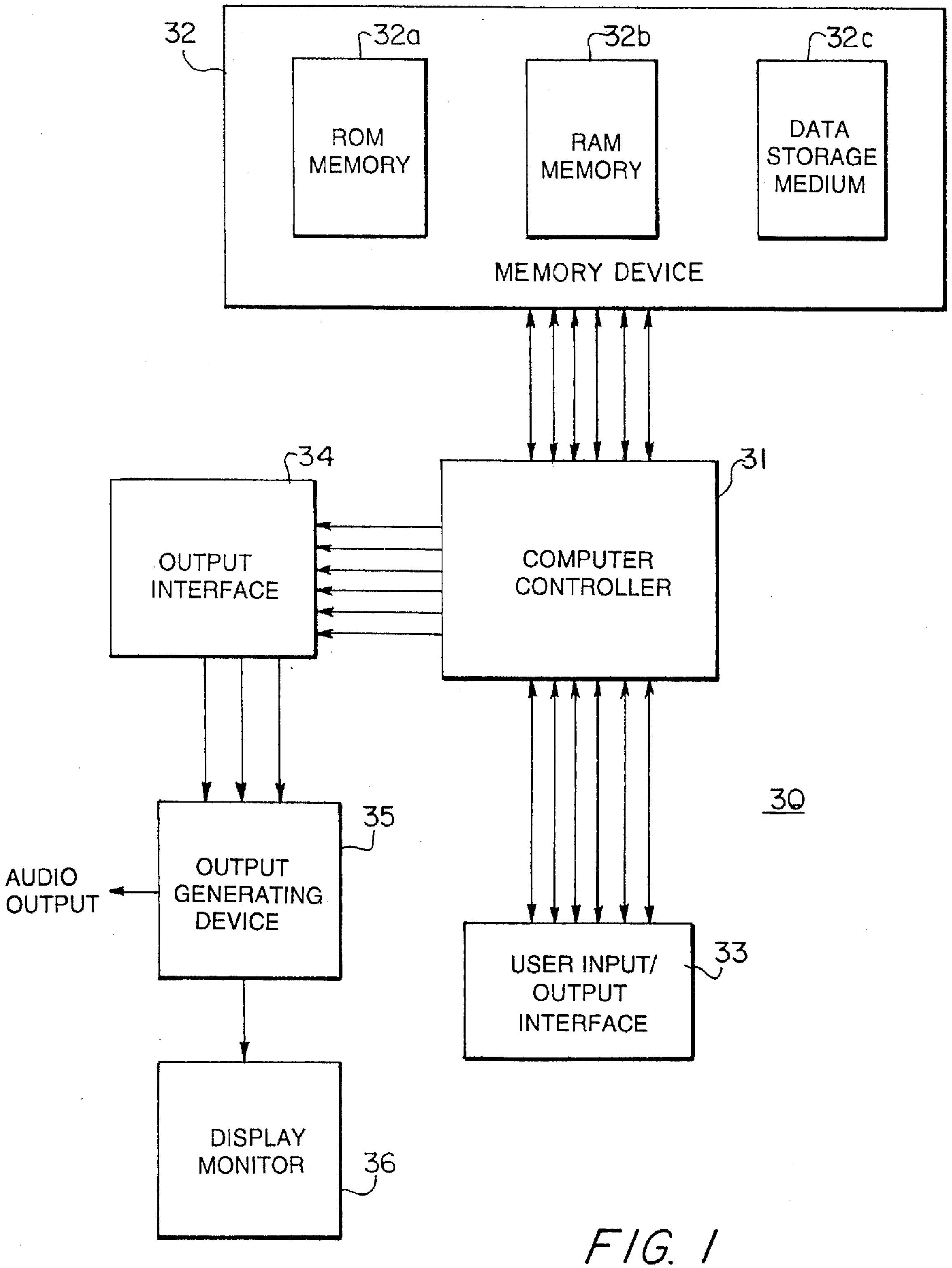
FIG. 1 illustrates a typical computer processor-based system applicable to the present invention.

FIG. 1 further shows a block diagram of the general components of a system such as the 3DO Interactive Multiplayer system or other computer-based system in which the present invention is implemented. As shown, the system generally comprises a computer processor-based device 30 that incorporates a computer controller 31, a memory device 32, a user input/output (I/O) interface 33, an output interface 34, an output generating device 35, and a display 36. The memory device includes ROM memory 32*a*, RAM memory 32*b*, as well as storage media for storing data 32*c* such as diskettes and CD-ROMs. The user I/O interface 33 includes a hand-held controller, a keyboard, a mouse or even a joystick, all operating in conjunction with a display 36 (i.e., a color television or monitor). One example as noted above for an output interface 34 would be a MIDI-based circuit device. Examples for output generating devices would include a MIDI-controllable keyboard or other synthesizer, a sample-based sound source, or other electronically-controlled musical instrument. The display device (i.e., a color television or video monitor) can be connected so as to display a menu with which a user can visually interact with the present invention, and produce color displays or images that are coordinated with the actual playing of the musical composition.

Figure 2:
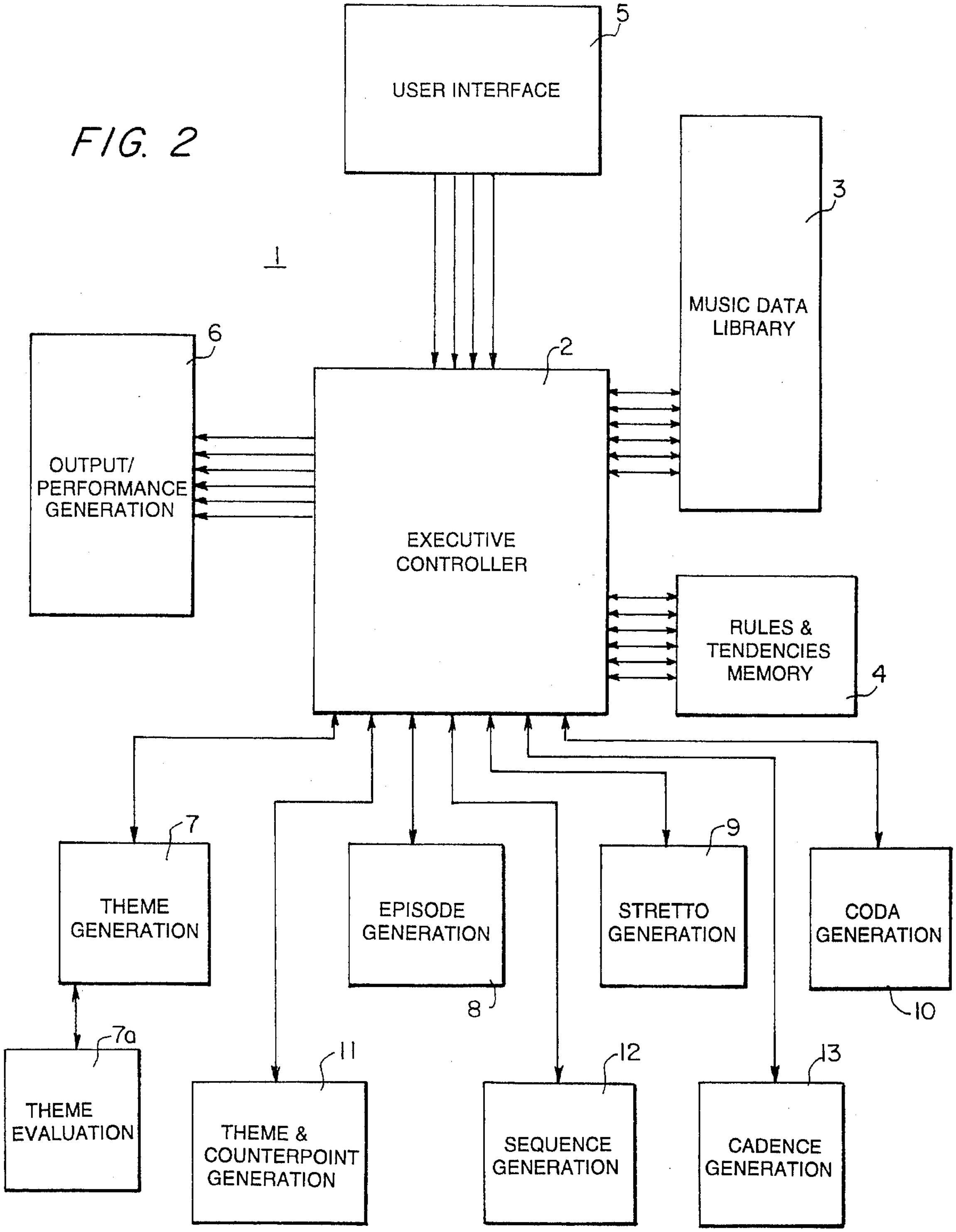
FIG. 2 illustrates a system block diagram of the overall structure and operation of a preferred embodiment of the present invention.
Figure 3:
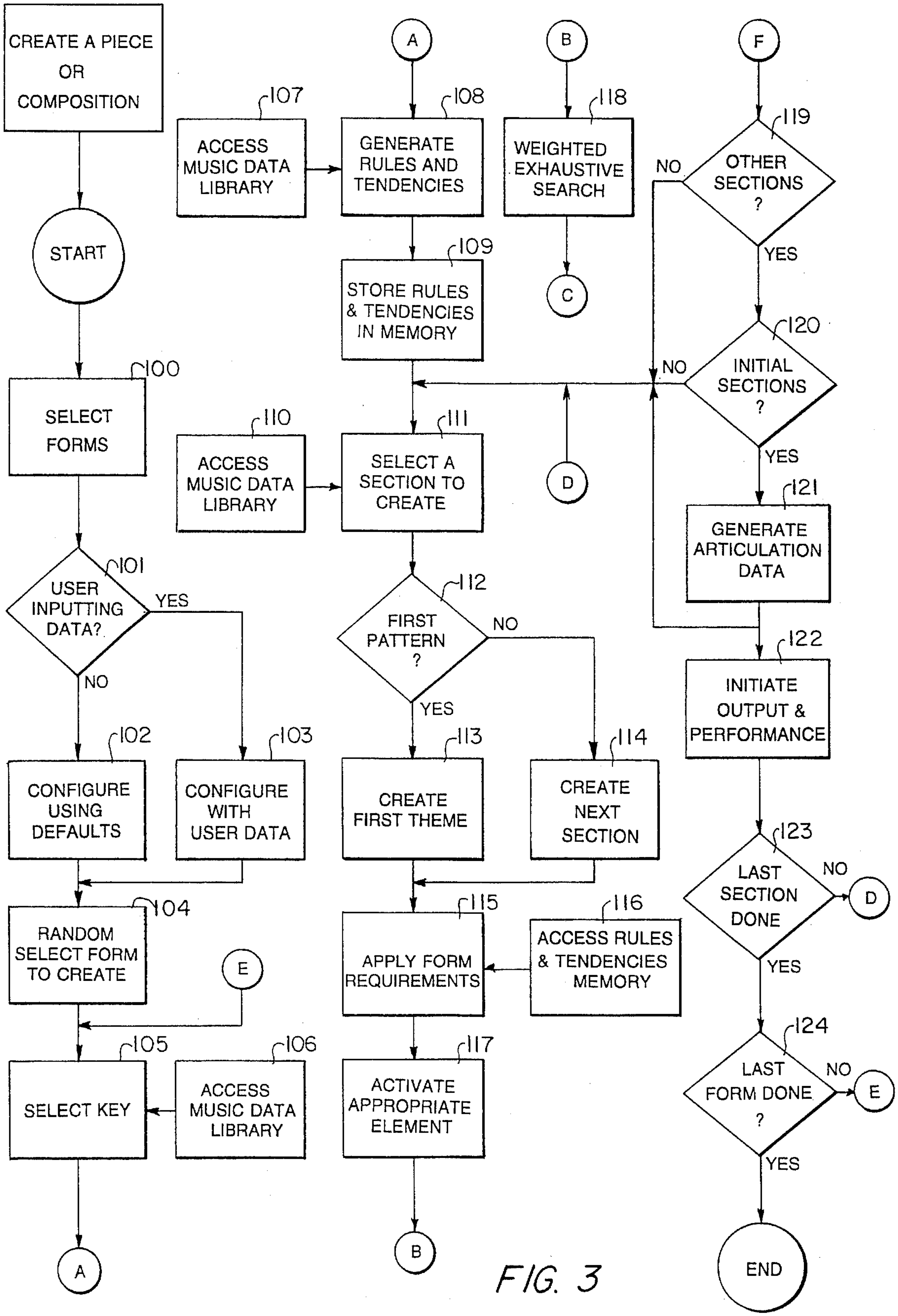
FIG. 3 shows a flowchart illustrating the general operation of the preferred embodiment of the present invention.

As illustrated in FIG. 2, the system 1 is structurally and operationally divided into an executive controller 2, a music data library 3 accessed by the executive controller 2, a rules, tendencies, and articulation (RTA) memory 4 generated by the executive controller 2, a user interface 5, an output/performance generation element 6, and a plurality of section generation elements. These section generation elements consist of a THEME generation element 7, an EPISODE generation element 8, a STRETTO generation element 9, a CODA generation element 10, a THEME & COUNTERPOINT generation element 11, a SEQUENCE generation element 12 and a CADENCE generation element 13. The THEME generation element 7 also includes a THEME evaluation sub-element 7*a* in its operation in order to generate the theme section of the composition. The system 1 is originally stored in a data storage medium such as a diskette or CD-ROM. In operation, the entire system 1 is loaded into the memory device (e.g., the RAM memory 32*b*) of the computer processor-based device 30 implementing it. From the RAM memory 32*b*, the computer controller 31 accesses the executive controller 2 in order to operate.

The executive controller 2 as noted is the control element of the system 1, and operates to control the access to and the operation of all the other elements loaded in the RAM memory 32*b*. The music data library 3 accessed by the executive controller 2 is loaded to provide the basic parameters and data used not only by the executive controller 2, but also by each of the section generating elements. The rules, tendencies, and articulation (RTA) memory 4 is generated by the executive controller 2 and is stored in the RAM memory 32*b* to be accessed by the various section generating elements. The user interface 5 contains the data inputted by a user through the user I/O interface device 33. The output/performance generation element 6 is loaded to take the music data created in the section generation elements and organized by the executive controller 2, and to translate the music data to be used by the output interface 34 to operate an appropriate output generating device 35.

Each of the section generation elements in the RAM memory 32*b* is configured with or to access specific parameters stored in either the music data library 3 or the RTA memory 4, which are themselves loaded in the Palm memory 32*b*, to generate a particular musical phrase or melody. For example, in a preferred application, the THEME generation element 7 is configured to generate the subject melody that is characteristic of sonatas, fugues, etc. The EPISODE generation element 8 is configured to generate the secondary passage that forms a digression from a main musical theme for fugues, rondos, etc. The STRETTO generation element 9 is configured to produce the passage that operates as an imitation of the theme that overlaps with the theme for fugues, or as a concluding section in increased speed for non-fugal compositions. The CODA generation element 10 is configured to produce the concluding passage that is designed to fall out of the basic structure of the composition to which it is added in order to obtain or heighten the impression of finality. The THEME & COUNTERPOINT generation element 11 produces passages of two or more melodic lines or voices that sound simultaneously. The SEQUENCE generation element 12 produces passages that repeat short figures in the same line or voice (melodic sequences), but at different pitches, and/or harmonic patterns at different pitch levels (harmonic sequences). Lastly, the CADENCE generation element 13 produces passages consisting of a progression of two or more chords used at the end of a composition, section or phrase to convey a feeling of permanent or temporary repose.

Figure 8A:
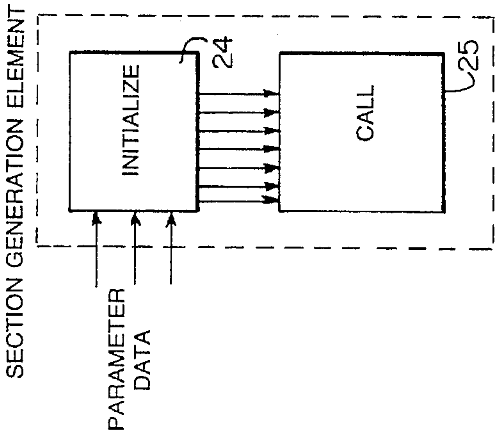
FIG. 8A shows a system block diagram of the general structure and operation of a section generating element according to the present invention.

Operationally, each of the section generating elements in the RAM memory 32*b*, as shown in FIG. 8A, generally consists of an INITIALIZE sub-element 24 for accessing and initializing the various parameters stored in the music data library 3 or the RTA memory 4 for generating the section to which the element is dedicated, and a CALL sub-element 25 for activating the weighted exhaustive search process, as will be explained below. The CALL sub-element 25 can access the weighted exhaustive search process as many times as necessary in order to complete the generation of its designated section.

Figure 8B:
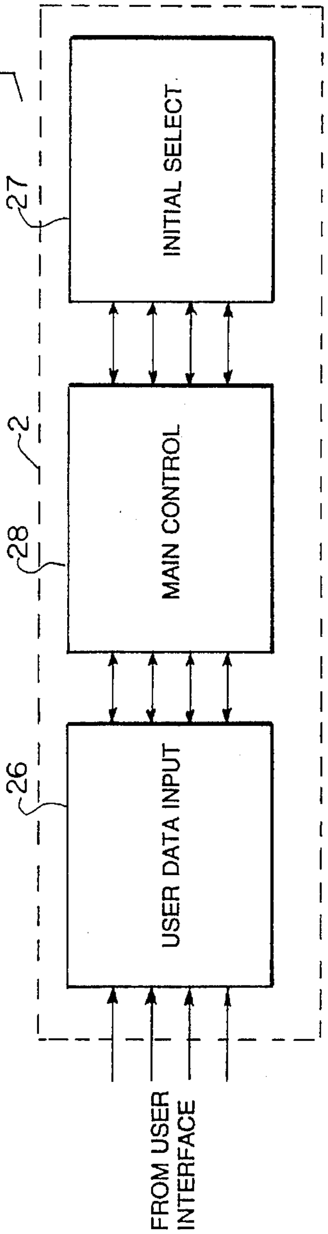
FIG. 8B shows a system block diagram of the general structure and operation of the executive controller according to the present invention.
Figure 6:
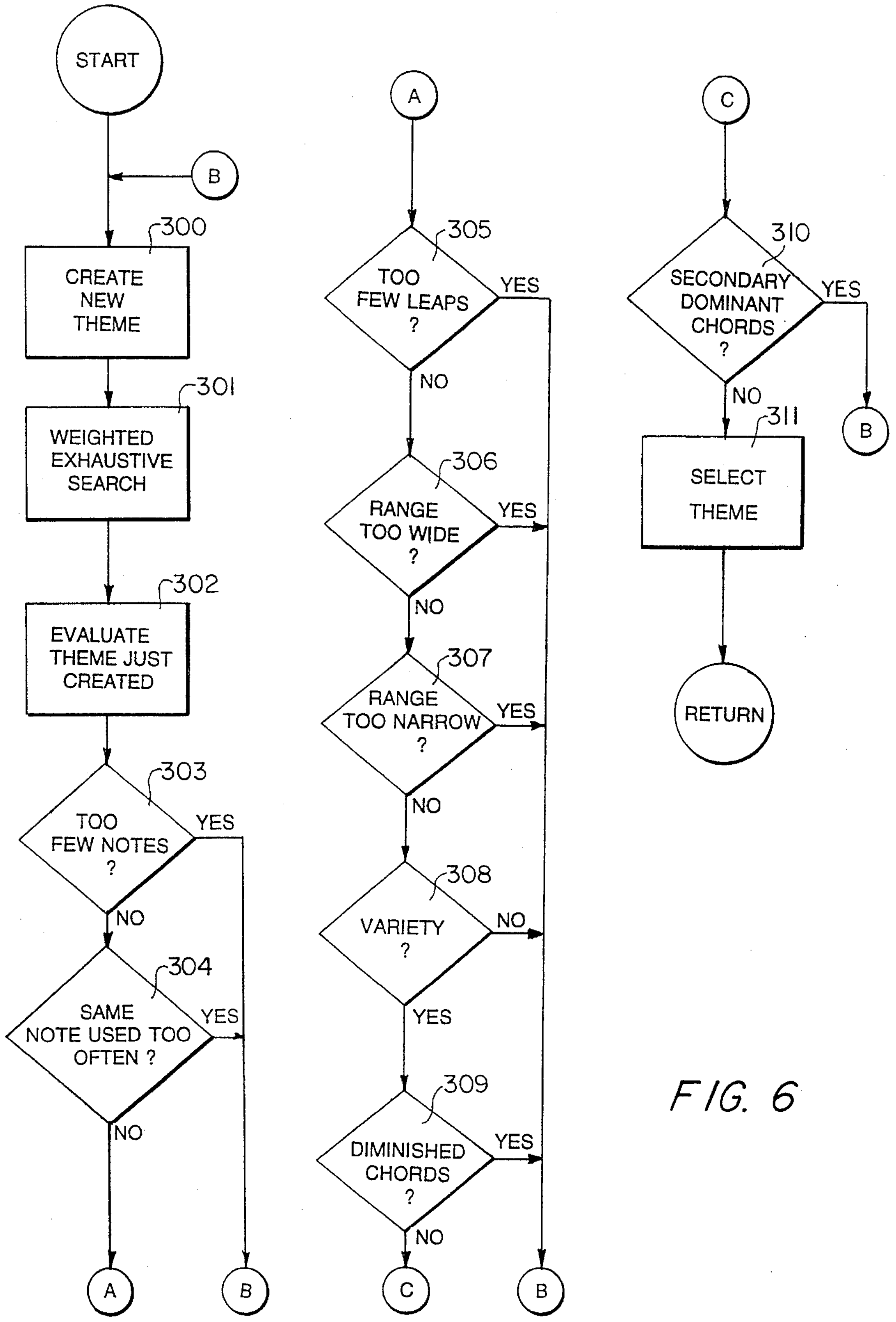
FIG. 6 shows a flowchart illustrating the theme evaluation process of the preferred embodiment of the present invention.

The executive controller 2 in the RAM memory 32b as shown in FIG. 8B incorporates a USER DATA INPUT sub-element 26 connected to the user interface 5 for receiving user data, and an INITIAL SELECT sub-element 27 that randomly determines the key, the sequence of musical form(s) selected in the user data, and the instrumentation of the selected form(s).

In operation, the computer controller 31 executes the executive controller 2 of the system by first generating the form(s) and key for a musical composition, which are stored in the RAM memory 32b of the device. Each of the section generation elements is then selectively accessed by the computer controller through the executive controller 2 in order to generate each section of the selected form(s) in a composition.

In selecting the form(s) for the concert program (See FIG. 2, Step 100), a user can interact with the system 1 using the user I/O interface device 33 (for the 3DO system, a handheld controller) to select, among other things, the form(s) of the music to be generated, and the musical instruments to be used for playing the selected form(s) (Step 101). The selections available to the user are displayed on the display monitor 36 as a menu. The selections made by the user are inputted into the system 1 as user data. The user data is then stored in the USER DATA INPUT sub-element 26 of the user interface 5 (Step 103). Alternatively, the executive controller 2 may use a pre-programmed default selection process (Step 102) that is stored in the RAM memory 32b with the executive controller 2.

Once the form(s) to be generated for the composition are selected, the computer controller 31 executes the executive controller 2 to randomly selects which form to generate using a probability based on a percentage of how much of the concert program a particular form comprises (Step 104). For instance, a user can program the system 1 through the interface 5 to generate a concert program with forms comprising a combination of a prelude (30%), a fugue (30%), and a concerto (40%) only. Alternatively, one example of a pre-programmed default selection process (Step 102) would be that a concert program would automatically consist of an even distribution of examples of several different forms (e.g., with ten different musical forms, each would have a 10% probability). Thus, the first form or any succeeding form would be selected to be generated based on the above or similar probabilities.

The forms that can be selected from may include a prelude, a fugue, a concerto allegro, a concerto adagio, a concerto vivace, various movements of a dance suite, a chorale, a chorale prelude, a fantasia, and various movements of a baroque sonata.

The structure of the forms stored originally in the data storage medium (e.g., CD-ROM) and then in the music data library 3 are quantified definitions representative of the characteristics of a particular musical genre. For example, the data could be designed to quantitatively define the musical style of the Baroque period or even of Johann Sebastian Bach in particular. In other words, the characteristics of the particular musical genre are translated into conditional logic routines which are applied when the different forms are being generated. These logic routines when accessed will allow or prohibit various melodic/rhythmic events consistent with the characteristics of the different forms. These logic routines also define which, how many and what order the section generating elements are to be activated as will be explained below.

After selecting a form, the computer controller 31 executes the executive controller 2 to then randomly select a key (Step 105) while taking into consideration parameters for determining a key in the selected forms (in the example, a prelude, a fugue and a concerto) using data from the music data library 3 (Step 106), and then store data on the selected key in the music data library 3. The executive controller 2 is executed to first access the music data library 3 (Step 106) and then randomly select the key from data on the twenty-four major or minor keys (Step 105) stored in the library 3. The executive controller 2 weights the random selection of the key based on the parameters defined in the music data library 3 that may be applicable to the selected form(s).

In order to actually generate the form(s) selected, different combinations and numbers of the various sections are generated as defined in the music data library 3. Using the form(s) and key chosen as stored in the RAM memory 32b, the executive controller 2 is executed through its MAIN CONTROL sub-element 28 (See FIG. 8B) to then access the rules stored in the library 3, and define rhythmic and melodic tendencies that will be applicable to the composition (Step 108), again accessing the music data library (Step 107). The executive controller 2 then stores these applicable rules and defined tendencies in the RTA memory 4 (Step 109).

For the purposes of the present invention, a "rule" is a quantified characteristic parameter with which a composition generated by the system will always comply. "Rules" encompass characteristics based on music theory and/or a particular musical style that are always followed. "Rules" are therefore quantified as the conditional logic routines, stored first in the music data library 3 and then in the RTA memory 4, that will allow or prohibit certain note patterns, rhythmic patterns, consonances, dissonances and note ranges. These "rules" can also be generally categorized as being directed to examining melody or harmony. For example, the "rules" that would be applicable to the Baroque period or more specifically J. S. Bach would include conditional logic translations of the following:

TO EXAMINE MELODY:

Notes higher than the highest note allowed or lower than the lowest note for a particular instrument are rejected.

Notes longer than the last note and not members of the current chord are rejected.

Leaps of more than a fifth are always followed by a step back.

No note can be selected higher than Note 64 or lower than Note 12 as defined per MIDI-standard.

Notes not in the current chord and preceded by a rest are prohibited.

Two leaps in the same direction unless all notes are in the chord are prohibited.

A step followed by a leap in the same direction if the first note is a sixteenth note is prohibited.

TO EXAMINE HARMONY:

Notes reached by a leap of a fourth or more, which are not members of the current chord are rejected.

Notes not in the current key or current chord are prohibited.

A "tendency" is also a quantified characteristic parameter that, unlike a "rule", is not followed in every case. "Tendencies" encompass characteristics that may or may not be used in a particular type of composition, such as characteristics that are idiosyncratic to a musical style or the stylistic touch of a particular composer. "Tendencies" are quantified as conditional logic routines, also stored first in the music data library 3 and then in the RTA memory 4, that assign favorable or unfavorable scoring values to the occurrence of certain types of note patterns, rhythmic patterns, consonances, dissonances, and note ranges, and that will vary from piece to piece. The scoring values that the "tendencies" assign are defined by the type of section being generated, and are given initial scoring values by the executive controller 2 when first stored in the RTA memory 4 (Step 109). As different section generating elements are accessed, these initial scoring values are weighted. One section may favor the application of a particular "tendency" and thus adjust the initial value to a high scoring value, while a different type of section may discourage that same "tendency" and thus adjust the initial scoring value lower. These scoring values can range between −16 to −4 and +4 to +16. Since the tendencies are initialized by the executive controller 2 at the beginning of each composition, the same tendencies are not followed between different compositions. However, within the same composition, the tendencies are followed by the relevant sections. "Tendencies" are thus parameters that introduce randomness or variety between compositions. As an example, the "tendencies" applicable to the Baroque period and/or the style of J. S. Bach include conditional logic translations of the following:

TO EXAMINE MELODY:

Favor small steps over large skips;

Discourage repeating the same note;

Favor continuing a scale passage;

Favor patterns which match previous patterns;

TO EXAMINE HARMONY:

Discourage doubling notes in chords;

TO EXAMINE DISSONANCE:

Discourage dissonant intervals between notes.

Favor consonant intervals between notes.

TO EXAMINE RHYTHM:

Discourage simultaneous playing of notes with voices intended to contrast with each other.

Favor simultaneous playing of notes with voices intended to support.

When generating a particular form, the computer controller 31 executes the executive controller 2 to access the music data library 3 to determine which of the section generation elements it will need to activate and in what order (Steps 110–111). Initially, for any given form, the executive controller 2 executes to generate at least one theme; this will be the first section that be created (Steps 112, 113). Accessing the RTA memory 4 (Step 116), the rules and tendencies stored are applied (Step 115) to the activation and operation of the THEME generation element 7 (Step 117). In the above example of forms consistent with the style of the Baroque period and/or J. S. Bach, at least all the above rules and tendencies be applied.

Through the execution of the executive controller 2, the computer controller 31 accesses and executes the individual section generation element. In doing so, the computer controller 31 carries out the weighted exhaustive search (Step 118) until the section is created. The section generation element that is activated, in this case the THEME generation element 7, in turn signals the executive controller 2 when it has finished the theme, and then reverts control back to the operation of the executive controller 2.

The executive controller 2 thereafter executes to determine if any other sections must be created (Steps 119) for the selected form being generated. If other sections are required, the executive controller 2 is executed to create the next succeeding section (Steps 111 and 114) according to the appropriate form and key requirements (Step 115), and activate the appropriate section generation element (Step 117). In this stage of the operation, the executive controller 2 is executed by the computer controller 31 to activate any number or combination of the section generation elements one after the other, including the THEME generation element 7 again, to create all the sections of the form(s) needed.

During the process of creating multiple sections, the executive controller 2 is executed to determine whether a predetermined number of the sections of the concert have been initially created (Step 120) and stored in the RAM memory **32*b*. If that predetermined number is reached, the controller 2 proceeds to initiating the output and performance operation (Step 122) and accesses the output/performance generation element 6. At the same time, the executive controller 2 is executed to continue generating and storing the remainder of the sections of the selected form(s) (Step 111). The remainder of the sections will in turn be used in the output and performance operation (Step 122) accordingly. The predetermined number of created initial sections is data defined in the music data library 3 so as to insure uninterrupted performance by the output performance and generation element 6, while the executive controller 2 continues to generate the remaining sections. In other words, the data on the predetermined number of initial sections may be set so that the executive controller 2 will activate the output and performance element 6 to output that initial number of sections already stored in RAM memory 32*b*. For example, the data on the predetermined number of initial sections specifies that the equivalent of 20 seconds worth of sections of music data must be generated initially. The executive controller 2 then executes to produce and store enough music data for the computer controller 31 to control the output generating device 35 to initially play for 20 seconds using the initial music data. During those first 20 seconds of play, the Computer controller 31 executes the executive controller 2 to continue generating the succeeding sections of the composition. Thus, when the first 20 seconds of play expire, additional sections are already stored in RAM memory 32*b*** and ready to be played, while still other sections are being generated.

The data on the predetermined number of sections and thus the initial playing time is calculated by the executive controller 2 based on, among other factors, the type of form(s) selected by the user, and the types of sections being generated. In addition, in the execution of the executive controller 2, the predetermined number is calculated to factor in the processing time and type of computer processor-based device 30 implementing the system of the invention.

Prior to the actual operation of the output and performance, articulation data is generated by the execution of the executive controller 2 and stored in the RTA memory 4 for at least the initial sections to be played (Step 121) as will be explained below. After generating the articulation data, the executive controller 2 initiates output and performance (Step 122), and creates any succeeding sections (Steps 111 and 114–118).

Figure 4:
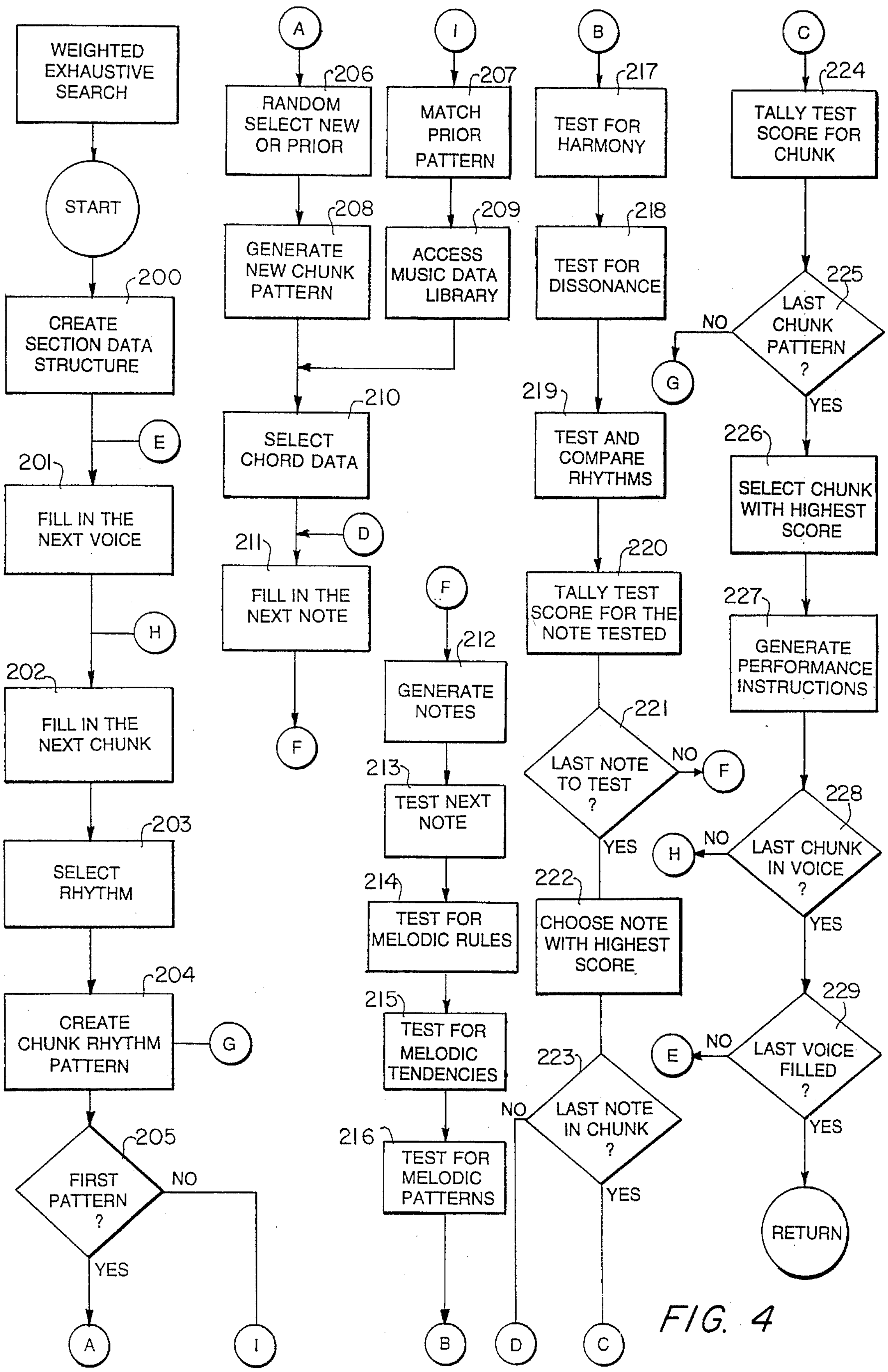
FIG. 4 shows a flowchart illustrating the weighted exhaustive search process of the preferred embodiment of the present invention.
Figure 5:
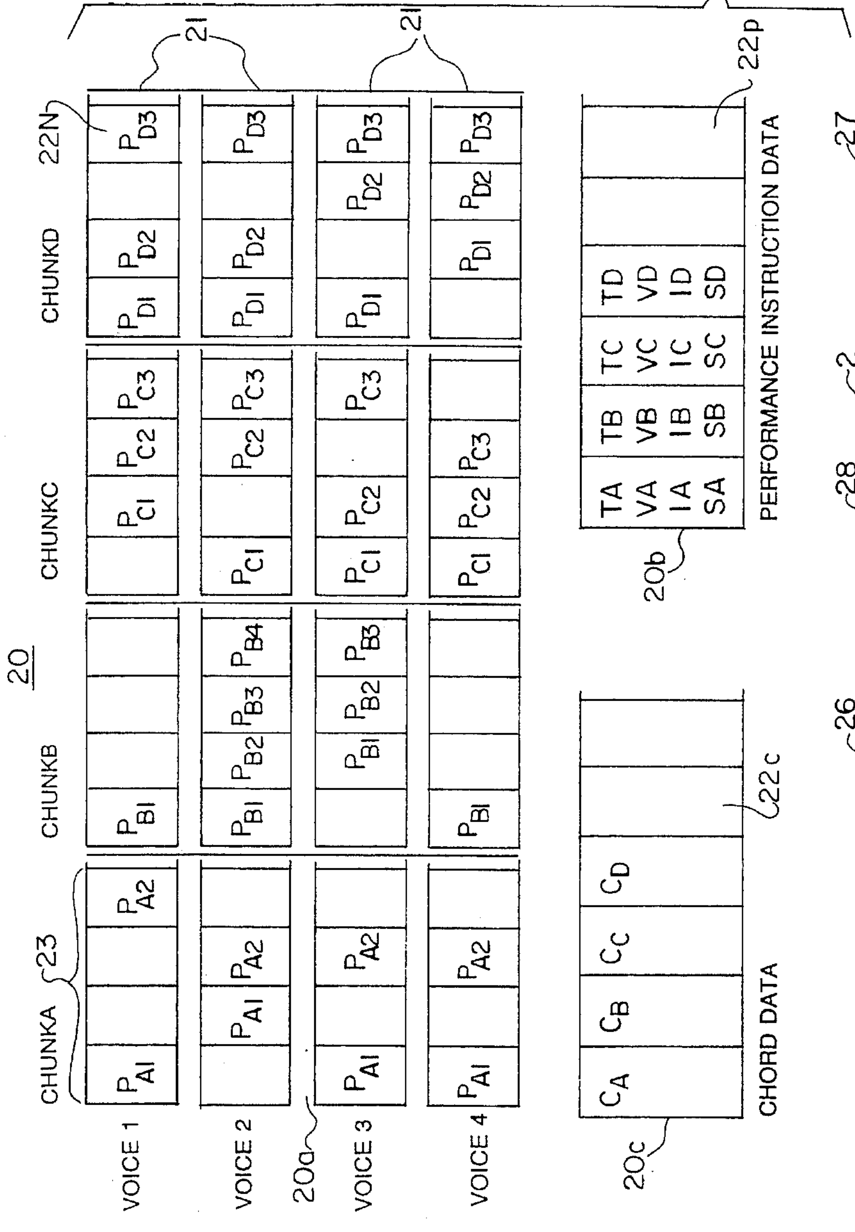
FIG. 5 illustrates a section data structure created during the weighted exhaustive search process of the present invention.

Each section generating element is accessed by the computer controller 31 to implement the process of a weighted exhaustive search, or a series of searches, in order to create the section that the particular element is tasked with generating (Step 200). This process is illustrated in FIGS. 4 and 5. In the execution of each element by the computer controller 31, the section to be generated is first defined as a blank section data structure 20 (Step 200) in the RAM memory **32*b*. That section data structure is filled one note at a time, one beat or chunk at a time, and one voice at a time. To do so, the system goes through the operation of selecting a rhythm (Step 203). As shown, the blank section data structure for the concert program is defined in the RAM memory 32b, and (Step 201) consists of an array of bytes allowing four different lines or "voices" of up to 16 notes each. As each section data structure is completed, it is then stored in the RAM memory 32b** as part of a program data structure for the entire concert program.

When completed, a program data structure in the RAM memory 32b, in one example, may consist of an array of 4×1500 bytes allowing four different "voices" of up to 1500 notes each, with an additional 1×500 array specifying chord information and a 1×500 array containing performance instructions. At the level of a section data structure, there be a 4×16 byte array of notes with a 1×6 array of chord data and a 1×6 array of performance instruction data defined in the RAM memory 32b. Approximately for every 3–4 notes (or bytes of note data), there is also defined in the RAM memory 32b one byte of chord data and one byte of performance instruction data. The actual number of bytes in the 1×6 arrays of chord data C and performance instruction data TVIS is determined by whether each chunk contains three or four notes. For example, if a line or voice containing a total of sixteen notes has chunks each having three notes, six bytes of chord data C and of performance instruction data TVIS are then necessary to provide data for all the notes. Whether the section being created is based on three or four notes per chunk is determined as discussed above by the parameters of the form or section being created as defined in the music data library 3.

The blank section data structure 20 created in the above-discussed operation is illustrated in FIG. 5. As shown, a typical section data structure 20 stored in the RAM memory 32b consists of four lines or "voices" 21, where each voice consist of twelve or sixteen data slots or notes 22 arranged in their chronological sequence for being played. As shown in FIG. 5, each line or voice 21 is then section divided into four data chunks or beats 23. Thus, if the line or voice were completely filled with note data, it may consist of a measure with sixteen sixteenth notes in four beats.

The section data structure 20 is formed with a pattern as to how many data slots there are in each data chunk or beat 23, and/or in each line or voice 21 (Step 204). This pattern is the initial implementation of the rhythm that is selected (See Step 203).

In creating the pattern for the section data structure 20, the computer controller 31 executes the current section generation element to determine whether patterns to be used for the current section data structure 20 still have to be generated or have already been generated for a prior section and can be used again (Step 205). First, if a pattern to be created is the first such pattern, a new pattern generation operation initiates (Step 206). If the pattern to be created is not the first, a matching prior pattern operation initiates (Step 207) where the prior pattern stored in the music data library 3 in the RAM memory 32b is accessed and applied (Step 209). If a new pattern is selected (Step 206), then a random selection is initiated to actually generate the pattern (Step 208).

Starting with the first line or voice 21 to be filled, the computer controller 31 executes the current section generation element to generate a pattern for a beat or chunk 23 to be created. The random selection process of the section generation element assigns each data slot 22 in the beat or chunk 23 a probability of a note being put into that data slot. For example, the probabilities of a note being placed in each data slot of a chunk may be quantified as a 100% probability for the first data slot, 40% for the second, 75% for the third, and 50% for the fourth data slot. The probabilities for each of the data slots are stored in the music data library 3 and represented as a table of all the possible combinations of chunk rhythm patterns. Thus, in essence, the selection of creating a chunk rhythm pattern based on the above probabilities is equivalent to randomly selecting one of the chunk rhythm patterns stored in the music data library 3 in the RAM memory 32b.

The weighting of the random selection of a rhythm is configured in the section generation elements to execute a selection that favors using a section data structure pattern or rhythm that was already used most often in the concert program. However, the random selection process described above still allows the selection of a less frequently used pattern. Effectively, the above-described random selection process is executed by the computer controller 31 to generate the chunk rhythm patterns by selecting the size of and the number of chunks or beats 23 in each line or voice 21, and to determine which data slots 22 in each beat or chunk 23 will be filled with note data or be left empty.

After selecting a chunk rhythm pattern for the beat or chunk 23 to be filled, the section generation element is then executed by the computer controller 31 to then fill in each of the data slots 22 (Step 212). As noted above, one of the four voices 21 is initially selected for filling (Step 201) one beat or chunk 23 at a time. Which line or voice 21 is filled and in what order is determined by the computer controller 31 accessing the music data library 3 for the parameters applicable to the current section generation element.

For example, in the THEME generation element 7, only one line or voice 21 is filled. In the EPISODE generation element 8, at any chronological point in the section data structure, only three voices are active or filled at that same point. In the STRETTO generation element 9, two voices are filled. The CODA generation element 10 fills three voices. The THEME & COUNTERPOINT generation element 11 fills two voices, while the SEQUENCE generation element fills three voices. The CADENCE generation element 13 fills three voices. Depending on the type of section being generated, the voice or combination of voices that are filled at any chronological point in the section data structure need not be the same voice(s) that are filled in any other point. In other words, for example, as shown in FIG. 5, a section in which three voices are filled may fill VOICE1, VOICE2, and VOICE3 at one point, and then fill VOICE2, VOICE3, and VOICE4 at another point.

At Step 202, a beat or chunk 23 in the selected line or voice 21 is selected to be filled (Step 201). After the chunk rhythm pattern is selected, chord data is selected designating the chord to be used in the current beat or chunk 23 (Step 210). Chord data C for the current beat or chunk 23 designates the chord in which the notes in the beat or chunk are to be played, and is indicative of each note's specific membership in the chord. The range of chords from which the computer controller 31 makes the selection in executing the current section generation element is stored in the music data library 3 and is based on the musical genre being implemented. In one example, the music data library 3 may contain a table of twelve major and twelve minor chords with parameters associated with each chord defining which chord can or cannot follow or precede other chords, as well as parameters for which chords are appropriate for a particular section or form. Thus, based on the current beat/chunk, line/voice and section being generated, the computer controller 31 executes the section generation element and selects a chord based on the chord data table. As shown in FIG. 5, each data slot 22C holds a data segment for every 3–4 notes in a corresponding beat or chunk in every line or voice in the 4×16 array.

In the selected beat or chunk 23, the section generation element is executed to select a data slot 22N to be filled with a note (Step 211). In memory, each data slot 22N, 22P or 22C represents the activity of a particular voice at a specific time in the composition, including the playing of a new note, sustaining a previous note, or being silent. A plurality of notes are generated by the computer controller 31 (Step 212) and tested (Step 213) one at time, one after the other. Generation of the notes to be tested is accomplished by the computer controller 31, wherein data representing all notes within one octave above and below the previously played note are considered under the parameters of the current section generation element. For example, data representing sixteen or more notes can initially be generated to be tested for each data slot. Potentially, up to twenty-four notes can be generated for testing if the applicable rules and tendencies allow such a range. However, as the computer controller 31 executes the current section generation element, notes which fail the requirements of the applicable rules from the RTA memory 4 are eliminated when tested. The applicable tendencies also from the RTA memory 4 then weight the notes accordingly either favorably or unfavorably.

As shown in FIG. 5, each data slot 22N in the 4×16 array 20*a* holds a data segment P for a single note representative of the pitch of a note. In the 1×6 array of performance instruction data 20*b*, each data slot 22P holds a data segment TVIS for every 3–4 notes in the 4×16 array consisting of data representative of tempo T, "velocity" V, instrumentation I, and the section beginning/ending S. The operation for generating the performance instruction data will be explained below.

As an example, as shown in FIG. 5, in the creation of one voice VOICE1 consisting of CHUNKA, CHUNKB, CHUNKC and CHUNKD in the 4×16 array of note data 20*a*, the first data slot in CHUNKA is filled with the data segment $P_{A1}$, while the third data slot contains $P_{A2}$. The second and fourth data slots are left empty. In CHUNKB, only the first data slot has a data segment $P_{B1}$, while the remaining three data slots are left empty. In CHUNKC, three data slots are filled with data segments $P_{C1}$ through $P_{C3}$. Lastly, in CHUNKD, the second and fourth data slots contain data segments $P_{D2}$ and $P_{D3}$, respectively.

The 1×6 array of performance instruction data 20*b* may, as an example, contain for CHUNKA a data segment $T_AV_AI_AS_A$, while for CHUNKB two data segments $T_BV_BI_BS_B$, for CHUNKC two data segments $T_CV_CI_CS_C$, and for CHUNKD a data segment $T_DV_DI_DS_D$. Correspondingly, the 1×6 array of chord data 20*c* may contain for CHUNKA two data segments $C_A$, while for CHUNKB two data segments $C_B$, for CHUNKC a data segment $C_C$, and for CHUNKD a data segment $C_D$.

As described above, when the computer controller 31 executes the current section generation element and fills the individual data slots 22N in each of the voices, all four of the slots 22N within a data chunk 23 are not necessarily filled with individual note data. The filling of the individual slots 22N is determined by the rhythmic probabilities that were applied when the chunk rhythm pattern was created. Data parameters which control the type of note data with which to fill the slots 22N are determined the individual section generation elements when implemented by the computer controller 31.

As discussed above, these data parameters control the weighting of the tendencies that are applied when testing the notes for the particular section being generated. With each of the generated notes, the computer controller 31 conducts a series of tests for the current section generation element in which the rules and tendencies stored in the RTA memory 4 are applied (Steps 214–219), the tendencies having been weighted based on the parameters specific to the current section generation element. In other words, each note is tested against each rule and tendency accessed from the RTA memory 4 by the computer controller 31 to determine how well the note satisfies all the rules and tendencies as modified by the specific parameters and structural requirements of the section being generated. The computer controller 31 then generates and stores in the RAM memory 32*b* a score for each test for the note just tested based on those applied rules and tendencies.

As illustrated above, the applied rules can be subdivided into those which test for melody and those which test for harmony. Similarly, the tendencies can be sub-divided into those which test for melody, harmony, dissonance, and rhythm. In this embodiment, the application of the rules and tendencies is illustrated as a series of tests of the divided groups by the computer controller 31 implementing the current section generation element. However, the application of the rules and tendencies can also be implemented with all the rules and tendencies together, or with the rules and tendencies divided into other categories and applied accordingly.

Using the illustrated test categories, in testing for melodic rules (Step 214), the note being tested is examined as to whether it fits the rules for examining melody accessed from the RTA memory 4. In particular, a note is tested as to whether or not it be played in accordance with music theory and/or the specific musical genre built into the system (i.e., Baroque period, the style of Johann Sebastian Bach). The scoring for this test is not weighted, since as discussed earlier, the requirements of rules are intended to be followed in all the relevant sections and in every composition created. Operationally, this test consists of the computer controller 31 examining the relationship between the note being tested and previous notes in the same voice in terms of pitch, rhythmic position, duration, and chord membership.

The test for melodic tendencies (Step 215) test for whether or not the note satisfies the tendencies created initially by the executive controller 2, stored in the RTA memory 4, and as weighted by the specific section generation element parameters. This test also encompasses the computer controller 31 examining the relationship between the note being tested and previous notes in the same voice in terms of pitch, rhythmic position, duration, and chord membership. Essentially, the note is tested and scored for whether it could be played in a composition having the selected form(s) and key in the musical style defined in the system.

In the test for melodic patterns (Step 216), the note is tested for whether such a note is consistent with the note(s) or pattern of notes that were selected to be played before it. This test consists of the computer controller 31 comparing the notes in the current beat/chunk, or line/voice with groups of notes previously generated at comparable locations in the composition. In other words, given the type of section being created and the notes or pattern of notes to be played before it, this test determines whether the note being tested falls within the range of possible notes that could be played and still remain consistent with the prior note(s) or pattern of notes. The scoring is thus weighted to insure consistency and balance, without unwarranted repetition. The requirements for what constitutes consistency and balance in testing for melodic patterns is derived from Gauldin, *A Practical Approach to Eighteenth-Century Counterpoint*, (1988) Prentice Hall, Inc., Englewood Cliffs, N.J., and Kennan, *Coun-*

*terpoint,* (1972), Prentice Hall, Inc., Englewood Cliffs, N.J., both references being incorporated herein by reference.

The test for harmony (Step 217) determines whether the note being tested is consistent with the notes in other voices which sound simultaneously with it. In this test, the computer controller 31 applies the harmony rules and tendencies from the RTA memory 4 to determine if the note satisfies the formal requirements for harmony. Here, the scoring is weighted to produce acceptable harmonic progression as defined in the Gauldin and Kennan references cited above, and in Rameau, *Treatise on Harmony,* (1971), Dover Publications, Inc. (First Published in 1722) which is also hereby incorporated by reference.

The test for dissonance (Step 218) determines whether the note being tested forms acceptable dissonance and resolution formula, consistent with the style. The test consists of the computer controller 31 calculating the pitch interval between two pitch classes and treating as dissonant the intervals of the second, seventh, and augmented fourth, with the intervals of the fourth, fifth, all thirds, and all sixths being considered consonant. In this test, the computer controller 31 applies the tendencies directed to dissonance as weighted by the type of section being created to determine if the note satisfies the formal requirements for dissonance. The scoring in this test is weighted to favor consonant intervals and discourage dissonant intervals as defined in the Gauldin, Kennan and Rameau references cited above.

The test for comparing rhythm (Step 219) compares whether the note being tested in conjunction with the other notes in the same voice is consistent with the notes and rhythm in other voices. This test consists of the computer controller 31 determining whether notes are played simultaneously in the various voices based on the tendencies accessed from the RTA memory 4. Voices which are intended to contrast with each other, as determined by the applicable rules and tendencies of the section, will weight such simultaneous occurrences with unfavorable values. Voices that, on the other hand, are intended to support each other will weight such occurrences favorably. The scoring in this test is also weighted based on the Gauldin, Kennan and Rameau references cited above.

At the end of the above series of tests on that one note, the computer controller 31 tallies the scores of that one note in each of the tests together into a note composite score (Step 220) and stores that note composite score into the RAM memory 32*b*. The computer controller 31 then determines if any other notes need to be tested (Step 221). If so, the computer controller 31 executes the current section generation element and selects the next note repeating the above tests and tallying of scores for all other notes requiring testing (Steps 211–220).

If all notes have been tested, the computer controller 31 then evaluates the scores of each of the notes, and determines which of the notes received the highest score. The note with the highest score is selected to fill the data slot (Step 222).

The computer controller 31 afterwards determines whether any other data slots in the current chunk must be filled with notes (Step 223). If other slots must be filled, the computer controller 31 selects the next data slot 22 to be filled, and repeats the process of generating notes and testing each one of those notes (Steps 211–222).

If all the data slots 22 in a beat or chunk 23 to be filled with a note are completed, then the computer controller 31 tallies the scores of the notes in the chunk together to form a chunk composite score (Step 224). The computer controller 31 then determines if any other chunk rhythm patterns from the music data library 3 can be tested (Step 225). This step only activates if a new pattern was selected to be generated, and not when a prior pattern is selected. If other chunk rhythm patterns are to be tested, the process randomly selects a new chunk rhythm pattern and repeats the above steps for generating and testing notes with which to fill the chunk (Step 204–224).

If all chunk rhythm patterns have been generated and had chunk composite scores tallied, the scores of the different chunks are evaluated by the computer controller 31. The chunk with the highest score is selected to fill the position of the beat or chunk 23 currently being tested (Step 226).

Once a beat or chunk 23 is completed, performance instruction data is generated by the computer controller 31 consisting of data representative of tempo T, "velocity" V, instrumentation data I, and the section beginning/ending data S (Step 227). The performance instruction data TVIS which the computer controller 31 generates is based on the parameters of the current section generation element defined in the music data library 3, and on the selection of the user. In other words, data on the tempo, "velocity" instrumentation and section beginning/ending initially placed in the performance instruction data slots are generated by the computer controller 31 based on the formal requirements for the current section defined in the music data library.

The tempo data T designates the tempo for the current beat or chunk 23. The "velocity" data V is defined as the loudness or softness level of the notes in the beat or chunk 23. The section beginning/ending data S designates the beginning and ending of a section relative to other sections either preceding or following it. As noted above, in the 1×6 array of performance instruction data 20*b*, each data slot 22P holds a data segment for every 3–4 notes in the 4×16 array. Like the chord data C, each performance instruction data segment TVIS applies to corresponding beats or chunks in every line or voice in the 4×16 array.

The instrumentation data I originally defined in the data storage medium (CD-ROM or diskette) and then loaded into the RAM memory 32*b* of the computer processor-based device defines what musical instrument sound is to be generated. The types of instrument sounds from which selections can be made may include a piano, an organ, a harpsichord, a synthesizer, an oboe, a flute, a recorder, a solo violin, a composite of strings, a composite of woodwinds, a chorus and a solo trumpet. Typically, the section generation elements are configured so that the instrumentation data I generated by the computer controller 31 for all the notes in a single voice will be the same, whereby the same instrument sound is selected through the entire voice. In the case of the synthesizer, each beat or data chunk 23 in a voice could be defined with a different synthesizer sound.

The instrument data I can be determined by the user data inputted into the executive controller 2 and achieved by the appropriate section generation element selecting the instrument according to the user data or randomly. In other words, as explained above, a user using the user I/O interface device (e.g., a hand-held controller) can select the type(s) of instruments he/she wants to hear from a menu on the display monitor. That instrument selection is inputted into the system 1 as part of the user input data. Alternatively, the computer can select the instrument based on the parameters of the current section generation element. When implementing the appropriate section generation element, the computer controller 31 accesses the user input data or default instrument data stored in the music data library 3 to generate the instrumentation data I for the performance instruction data of the appropriate section.

After generating the performance instruction data for the current chunk, the computer controller 31 determines if any other chunks in the current voice have to be created (Step 228). If so, the above steps of generating and testing notes, and generating and selecting chunks (Steps 202–226) are repeated. If however the last data slot 22, and beat or chunk 23 in the voice have been filled accordingly (Step 228), then the computer controller 31 determines whether all the voices in the data structure are completed (Step 229). If other voices must be filled, the steps for filling in the voice, generating chunk rhythm patterns, generating the notes, testing the notes and selecting the notes, evaluating the chunk rhythm patterns, and selecting the chunk rhythm patterns (Steps 201–228) are repeated for the other voices. If all the voices are filled, then the section has been completed and control reverts back to the computer controller executing the executive controller 2 for determining whether other sections in the concert program must be created (Steps 119). As discussed above, if the predetermined number of initial sections have been created (Step 120), the executive controller 2 will activate the output and performance element 6 (Step 122) to output those created initial sections, while continuing to generate the remaining sections.

Figure 7:
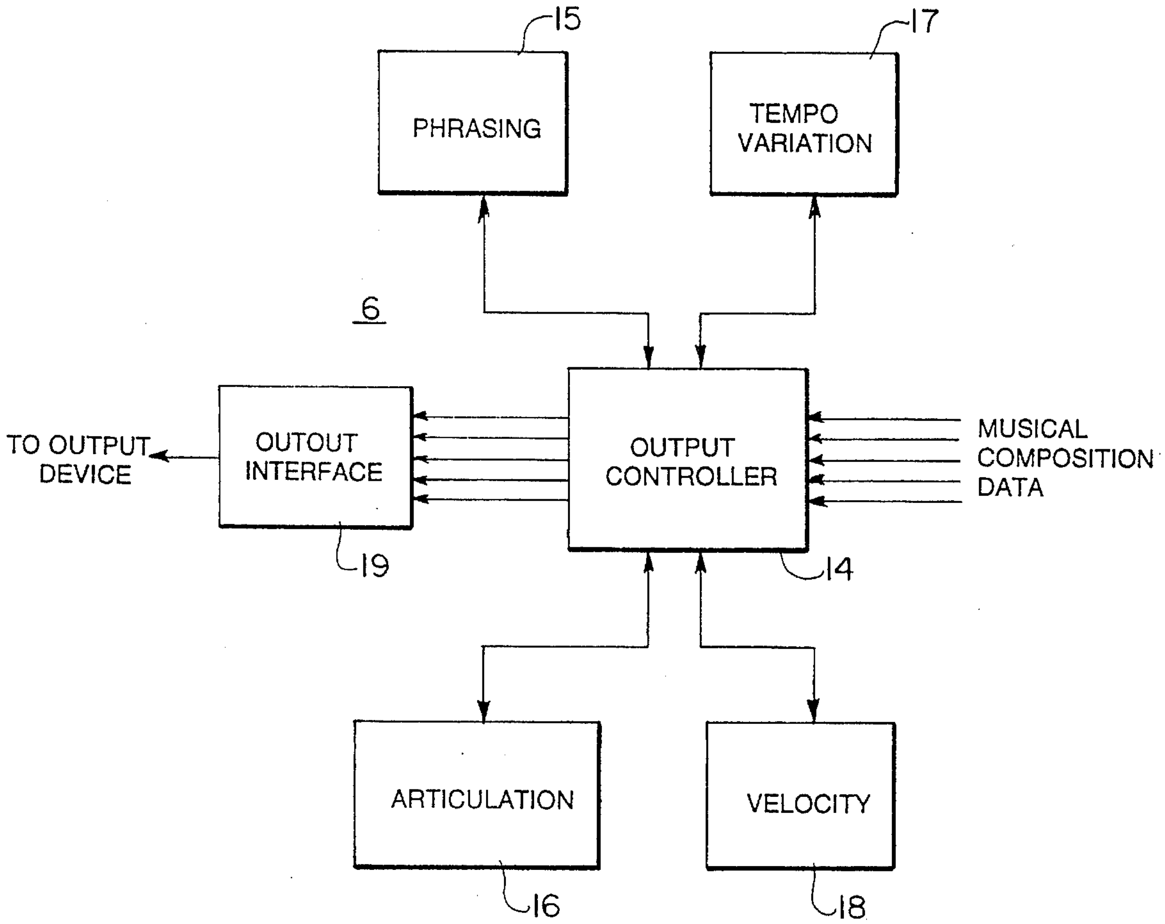
FIG. 7 illustrates a system block diagram of the structure and operation of the output/performance element of the preferred embodiment of the present invention.

When activating the THEME generation element, in addition to the weighted exhaustive search process, additional tests are performed by the computer controller 31 in the execution of this element in order to ensure the quality and correctness of the theme. The process utilized by the theme evaluation sub-element 7*a* and executed by the computer controller 31 is illustrated in FIG. 7 for not only the first theme created, but also any other subsequent theme. In the process of creating a new theme (Step 300), several other parameters are introduced to test the entire theme after all notes in the theme have been created (Step 302). As shown, sub-element 7*a* consists of testing for whether too few notes are in the theme's data structure (Step 303), the same note is used too often (Step 304), too few leaps are made in the theme (Step 305), the range of the theme is too wide (e.g., 10–14 notes) (Step 306), the range of the theme is too narrow (e.g., 6–8 notes) (Step 307), the rhythm of the theme has no variety (Step 308), and whether diminished and/or secondary dominant chords occur (Steps 309, 310). If the theme just created fails any of these added parameters, the computer controller 31 executes the THEME generation element 7 to create another new theme and to start the testing over (Step 300). On the other hand, if the theme passes all the added parameters, then that theme is selected (Step 311) and stored in the music data library 3 in the RAM memory 32*b*.

As mentioned earlier, articulation data is generated by the computer controller 31 prior to the output and performance operation. Articulation data A is data generated randomly during the execution of the executive controller 2 to vary the duration of selected notes in each chunk rhythm pattern. This data is stored in the RTA memory 4 in the RAM memory 32*b*, and is accessed by the computer controller 31 when outputting the composition. For example, using FIG. 5, articulation data segment $A_A$ may be assigned to CHUNKA that contains data segments $P_{A1}$, $P_{A2}$ which have an associated performance instruction data segment $T_AV_A$-$I_AS_A$. That particular articulation data segment $A_A$ randomly modifies the duration of each note to always play the notes of data segments $P_{A1}$, $P_{A2}$ either as long notes or short notes. In one example, there is a 50% probability of doing either. Other articulation data segments be assigned to other chunks with different chunk rhythm patterns and their associated performance data segments. Every time a chunk with a specific chunk rhythm pattern is outputted, the articulation data for that pattern is accessed by the computer controller 31 from the RTA memory 4 and applied. The generation and application of the articulation data A to the output is used to simulate the "inconsistent" and "random" playing of a composition by a human performer.

In the operation of the output/performance generation element 6 (See Step 122 in FIG. 2), the computer controller 31 as shown in FIG. 7 executes the output/performance generation element 6 in order to configure the music data, and to introduce variations in the output of the music so as to be "humanly" sounding as possible based on the articulation data A, chord data C and performance instruction data TVIS generated for each section. The system of the output/performance generation element 6 includes an output controller element 14, a phrasing element 15, an articulation element 16, a tempo variation element 17, a velocity element 18 and an output interface 19. The output controller 14 as executed by the computer controller 31 maintains overall control over the configuration of the music data assembled by the executive controller 2 for output. The output controller also is executed to control the other operations of the output and performance generation element 6 by directing access to the articulation data A, chord data C and performance instruction data TVIS. In configuring the music data for output, the output controller 14 is executed by the computer controller 31 to also access the instrumentation data I in the performance instruction data TVIS, and to also access other data/memory sources (i.e., CD-ROM or diskette) for musical instrument sample data. The output controller 14 matches the instrumentation data I with the musical instrument sample data for the actual playing of the music data.

In the articulation element 16, the rhythm or chunk rhythm pattern of each chunk is analyzed by the computer controller 31 and characteristic patterns are identified based on the articulation data A associated with the chunk from the RTA memory 4. As discussed above, each time a particular chunk rhythm pattern is outputted, those chunks or sections having those patterns are consistently articulated (varied in duration of the notes) throughout the composition as defined by their associated articulation data A.

In the tempo variation element 17, using the tempo data T from the performance instruction data, the computer controller 31 speeds and slows the tempo of the music slightly during each musical phrase to create a sense of rubato. This process creates a "swelling" in tempo that is coordinated with the intensity variations controlled by the phrasing element 15.

In the velocity element 18, using the velocity data V from the performance instruction data, the computer controller 31 configures the loudness or softness of the notes and/or chunks. In addition, using the velocity data V, certain types of sections are recognized and thereby designated as "climax" sections. Such sections are identified by the characteristics of increased activity in all voices, use of the upper part of the voice's note range, and a strong cadential ending on the tonic chord. At the musical apex of such sections, all of the characteristics controlled by the other elements of the output/performance generation element 6 are emphasized (swelling of intensity, a pulling back from the tempo, and exaggeration of articulation that creates "drive" toward the apex and a sense of arrival). This controlling of climax sections in the concert program is coordinated such that the output of such sections musically coincides with the arrival at a pre-selected harmonic goal.

In the phrasing element 15, both the velocity and tempo as initially defined in the performance instruction data are incrementally varied by the computer controller 31 for each note depending upon its position relative to the beginning and ending of the section or musical phrase in which it resides by accessing the tempo T, velocity V and section beginning/ending S data of the performance instruction data. The phrasing element 15 thus creates a swelling effect in the music output toward the middle of each musical phrase.

Based on the articulation data, chord data and performance instruction data generated for each chunk in the composition, the output controller 14 is then executed by the computer controller 31 to output the concert program to the output generating device 35 (i.e., a stereo system, a MIDI interface circuit) through the output interface 19. In other words, the computer controller uses the output and performance generation element 6 to not only configure all the data generated for each note and chunk for output, but also to make variations in the music data. These variations when implemented in the output make the concert program sound as if played by a "human" and not sound "perfectly" computer-generated.

In the operation of the output generating device 35, the computer controller 31 as discussed earlier outputs not only the music data of the concert program via audio output through a stereo system or electronic musical instruments, but also produces visual outputs through a display monitor 36. To do so, the computer controller 31 can, as in the preferred application, access data storage media (e.g., CD-ROM or diskettes) for various types of graphical displays or images to output on the display monitor 36. In the preferred application of the invention, the computer controller 31 controls the output generating device 35 such that graphical images are coordinated with the audio output. For example, if the computer controller 31 accesses graphical images of the instruments according to the instrumentation data I, the images can be animated to move and/or operate synchronized with the playing of the instrument. Alternatively, images of the musical score can be generated and displayed as the music is generated. Also, abstract color patterns can be generated wherein the changing colors and/or shifting patterns can be coordinated with the output of the music. An even further example is the displaying of a gallery of different pictures that are scrolled, faded in, faded out, translated, etc. coordinated with the music.

Overall, the present invention operates whereby parameters in all the various sections of the musical composition are considered. The desire of the invention's operation is to determine the solution or solutions that satisfy the optimum number of parameters established and required by the different elements. This process has been found to be effective and flexible because in general it represents a gradual tightening of acceptability, a process of narrowing down from the very general to the very specific. By the interaction of the various elements with various parameters using the weighted exhaustive search process, original compositions or pieces based on a consensus similar to the thought processes of an actual composer can be created.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A system for creating and generating original musical compositions in a computer-based data processing system, comprising:

an executive controller for generating musical form and key data to control formation of a musical composition;

a user interface operatively connected to said executive controller, for inputting user selected data for determining the form and key data generated by said executive controller;

a library memory means connected to said executive controller, for storing music data to be accessed by said executive controller in generating the form and key data;

a plurality of section generation elements, each of said section generating elements having data means for storing parameter data configured to a specific musical section for a selected section generation element, means for generating a data structure to be filled with note data for playing based on the form and key data from said executive controller, means for generating a plurality of notes to be tested for filling the data structure, means for testing each of the plurality of generated notes and for selecting notes in accordance with the parameter data for the selected section generation element from among the plurality of generated notes, and means for filling the data structure with selected notes until the data structure is filled in accordance with the form and key data, wherein said executive controller activates selected ones of said plurality of section generation elements based on the form and key data to generate selected sections, said executive controller further assembling the generated selected sections into musical composition data;

a rules, tendencies, and articulation (RTA) memory means connected to said executive controller, for storing musical rules, musical tendencies and articulation data to be accessed by said plurality of section generation elements, said executive controller further for generating the rules, tendencies, and articulation data based on the selected form and key data; and a music output performance generation element connected to receive the musical composition data from said executive controller, for configuring the musical composition data for outputting to an audio output system, and for interfacing with the audio output system.

2. A system for creating and generating original musical compositions according to claim 1, wherein said plurality of section generation elements include a theme generation element, an episode generation element, a stretto generation element, a coda generation element, a theme and counterpoint generation element, a sequence generation element and a cadence generation element.

3. A system for creating and generating original musical compositions according to claim 2, wherein the theme generation element includes a theme evaluation element for evaluating a plurality of themes generated by the theme generation element.

4. A system for creating and generating original musical compositions according to claim 1, wherein the means for generating a plurality of notes in each of said plurality of section generation elements includes means for generating for said plurality of notes data on at least a pitch of each note, a tempo of each note, a velocity of each note, an articulation of each note and a type of instrument with which to play each note.

5. A method for creating and generating original musical compositions in a computer-based data processing system, said method comprising the steps of:

(a) selecting at least one musical form;

(b) selecting a musical key;

(c) generating rules and tendencies parameter data based on the selected form and key;

(d) selecting a section of a musical composition to be generated;

(e) creating a data structure for the selected section based on the selected form and key, the data structure to be filled with note data for playing;

(f) selecting one of a plurality of data lines in the data structure for filling with note data;

(g) selecting one of a plurality of data chunks in the data line selected for filling with note data;

(h) selecting one of a plurality of data slots in a data chunk of the data line selected for filling with note data;

(i) generating a plurality of notes to be tested for filling one of a plurality of data slots in the data structure;

(j) testing one of the plurality of notes based on the rules and tendencies parameter data and determining a score value for the note;

(k) tallying all the scores of the note into a composite score;

(l) repeating steps (j) through (k) for a remainder of the plurality of notes generated;

(m) selecting the note with the highest composite score to fill the selected data slot;

(r) repeating steps (h) through (m) for a remainder of the plurality of data slots in a data chunk of a data line to be filled in the data;

(s) repeating steps (g) through (r) for a remainder of the plurality of data chunks in a data line to be filled in the data;

(t) repeating steps (f) through (s) for a remainder of the plurality of data lines to be filled;

(u) repeating steps (d) through (t) for each of a remainder of sections to be generated; and (v) outputting the musical composition data to an output device.

6. A method for creating and generating original musical compositions as set forth in claim 5, wherein said step of creating a data structure includes the step of selecting a rhythm for each data chunk in the data structure based on a weighted random selection of predetermined rhythm patterns and prior selected rhythm patterns.

7. A method for creating and generating original musical compositions as set forth in claim 5, wherein said step of outputting the musical composition data includes the steps of varying a velocity of each note based upon its relative position in the musical composition data, articulating each section in the musical composition data, varying a tempo of the musical composition in conjunction with the varying of the velocity of each note, and identifying sections in the musical composition data as climax sections so as to emphasize varying a velocity of each note based upon its relative position in the musical composition data, articulating each section and varying a tempo of the musical composition.

8. A method for creating and generating original musical compositions as set forth in claim 5, wherein said step of generating a plurality of notes includes the step of generating for said plurality of notes data on a pitch of each note, an articulation of each note, a velocity of each note, a tempo of each note and a type of instrument with which to play each note.

9. A method for creating and generating original musical compositions as set forth in claim 5, wherein said step of selecting a section to generate includes the step of selecting a section from a group consisting of at least a theme section, an episode section, a stretto section, a coda section, a theme and counterpoint section, a sequence section, and a cadence section.

10. A system for generating original musical compositions in a computer-based data processing system, comprising:

a user interface, for inputting user selected data to determine musical form and key data;

a library memory, for storing music data to be accessed in generating the form and key data;

a rules, tendencies, and articulation (RTA) memory connected to said executive controller, for storing musical rules, musical tendencies and articulation data to be accessed by said plurality of section generation elements;

a plurality of section generation elements each configured to generate a specific musical section of a musical composition, each of said section generating elements having means for generating a plurality of notes, means for testing each of the plurality of generated notes and for selecting notes to be played in accordance with parameter data from said library memory and said RTA memory; and an audio output element for assembling the selected notes into a musical composition and outputting the composition in accordance with parameter data from said library memory and said RTA memory.

11. A system for generating original musical compositions according to claim 10, wherein said plurality of section generation elements include a theme generation element, an episode generation element, a stretto generation element, a coda generation element, a theme and counterpoint generation element, a sequence generation element and a cadence generation element.

12. A system for generating original musical compositions according to claim 11, wherein the theme generation element includes a theme evaluation element for evaluating a plurality of themes generated by the theme generation element.

13. A system for creating and generating original musical compositions according to claim 10, wherein the means for generating a plurality of notes in each of said plurality of section generation elements includes means for generating for said plurality of notes data on at least a pitch of each note, a tempo of each note, a velocity of each note, an articulation of each note and a type of instrument with which to play each note.

14. A method for generating original musical compositions in a computer-based data processing system, said method comprising the steps of:

(a) selecting at least one musical form and key;

(b) generating rules and tendencies parameter data based on the selected form and key;

(c) generating a plurality of notes to be tested;

(d) testing each one of the plurality of notes based on the rules and tendencies parameter data and determining a score value for the note;

(e) tallying all the scores of the note into a composite score;

(f) repeating steps (d) through (e) for a remainder of the plurality of notes generated;

(g) selecting the note with the highest composite score to fill a selected data slot in a musical composition;

(h) repeating steps (c) through (g) for a remainder of a plurality of data slots in the musical composition; and (i) outputting the musical composition data to an output device.

15. A method for creating and generating original musical compositions as set forth in claim 14, wherein said step of outputting the musical composition data includes the steps of varying a velocity of each note based upon its relative position in the musical composition, articulating each note in the musical composition, and varying a tempo of the musical composition in conjunction with the varying of the velocity of each note.

16. A method for generating original musical compositions as set forth in claim 14, wherein said step of generating a plurality of notes includes the step of generating for said plurality of notes data on a pitch of each note, an articulation of each note, a velocity of each note, a tempo of each note and a type of instrument with which to play each note.

* * * * *

UNITED STATES PATENT AND TRADEMARK OFFICE

CERTIFICATE OF CORRECTION

PATENT NO. : 5,496,962

DATED : March 5, 1996

INVENTOR(S) : Sidney K. Meier et al.

It is certified that error appears in the above-indentified patent and that said Letters Patent is hereby corrected as shown below:

ON THE TITLE PAGE:

At [76], please change the second inventor's name as follows:

--Jeffery L. Briggs--

Signed and Sealed this

Eleventh Day of June, 1996

Attest:

BRUCE LEHMAN

Attesting Officer

*Commissioner of Patents and Trademarks*